Josef Boehm,
Leonard L. Mitchum,
INVENTOR.

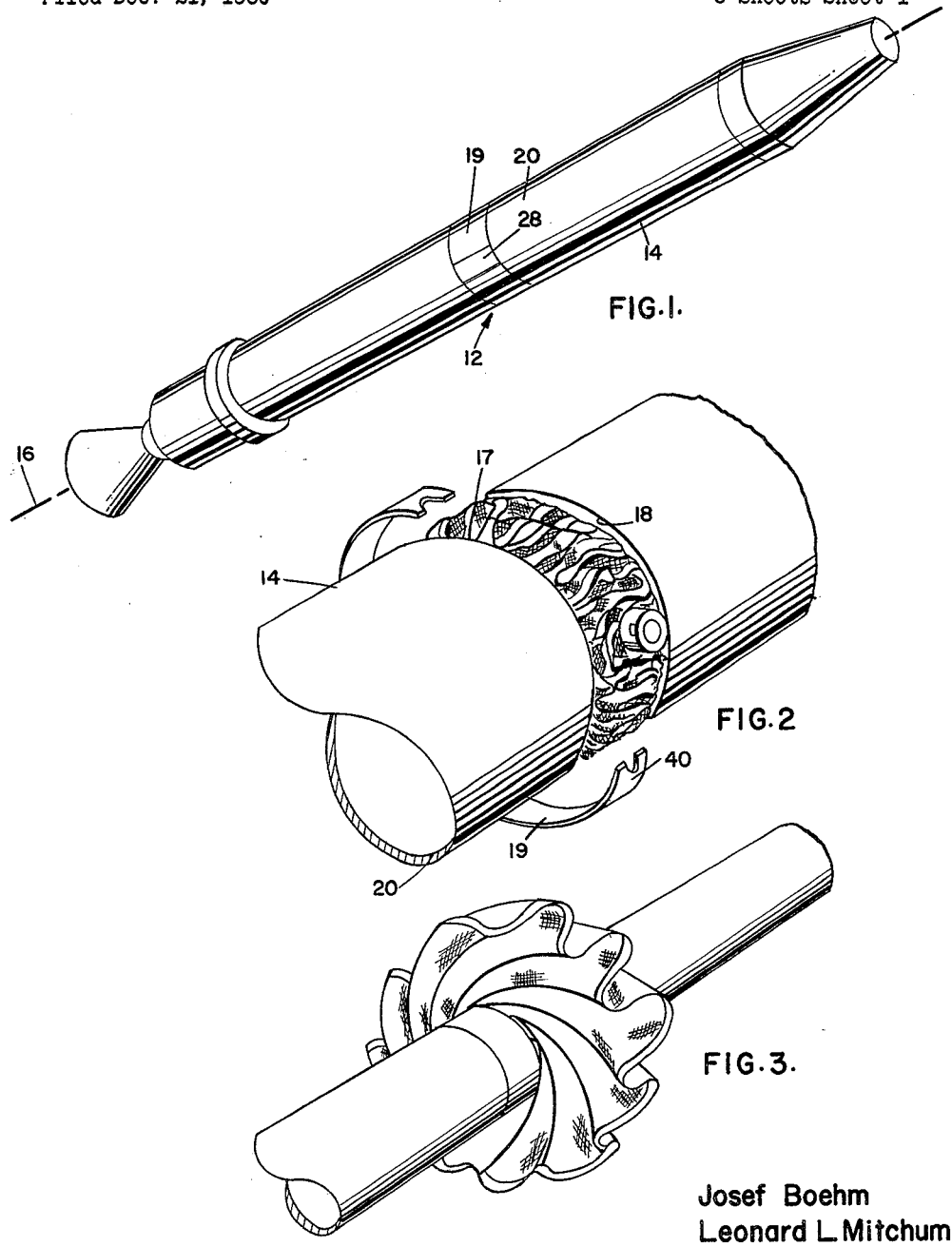

Josef Boehm
Leonard L. Mitchum,
INVENTOR.

Josef Boehm
Leonard L. Mitchum,
INVENTOR.

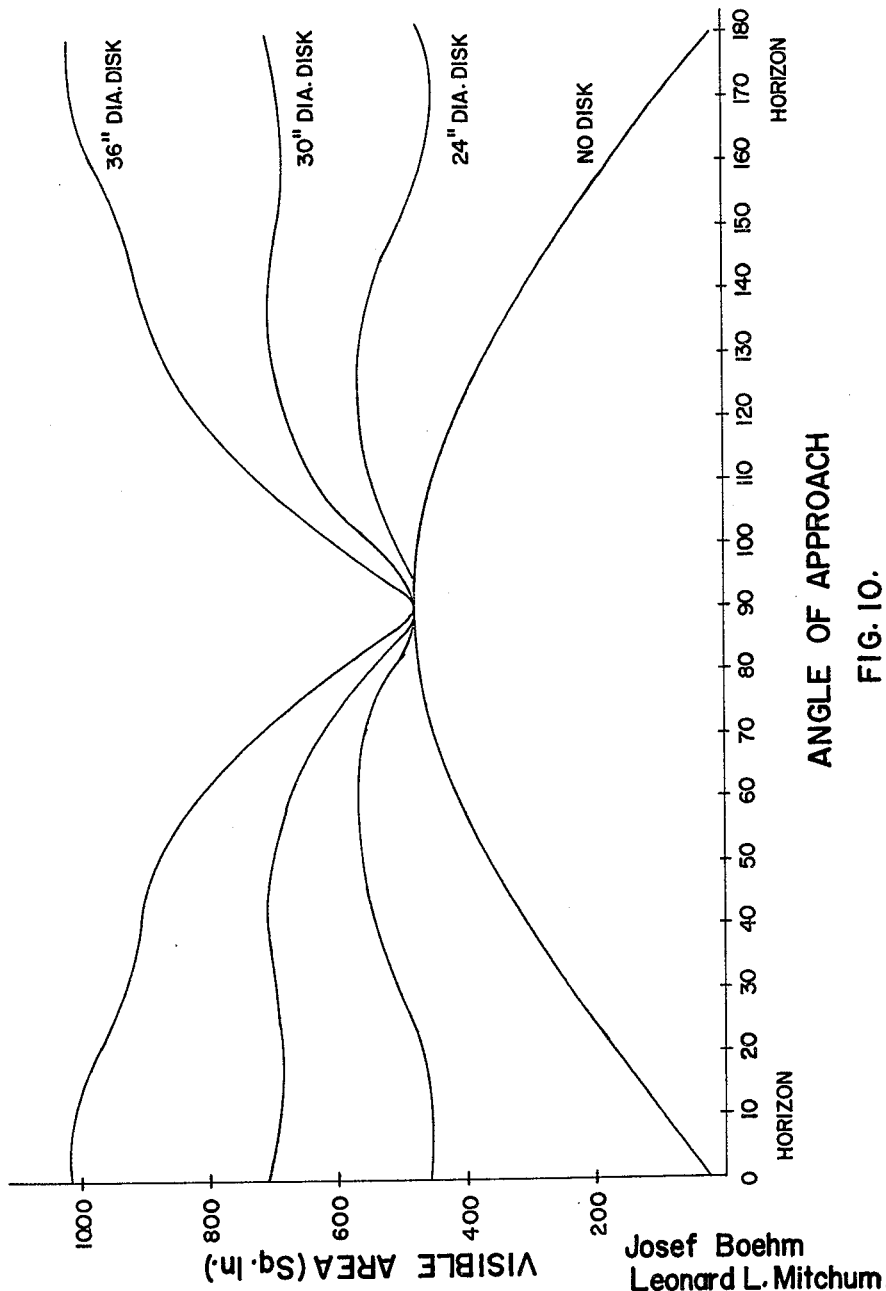

3,109,608
VISION SKIRT
Josef Boehm, 1311 Hermitage Ave., and Leonard L. Mitchum, 3509 Caymon Road, both of Huntsville, Ala.
Filed Dec. 21, 1960, Ser. No. 77,479
10 Claims. (Cl. 244—1)
(Granted under Title 35, U.S. Code (1952), sec. 266)

The invention described herein may be manufactured and used by or for the Government for governmental purposes without the payment of any royalty thereon.

Our invention relates to a cylindrical satellite and more particularly, to such a satellite provided with a device for supplementing the reflective area thereof.

Such satellites are disposed for transportation through the atmosphere and for application thereto of velocities for travel in orbits around bodies in space. The satellites are provided with cylindrical configurations and disposed for rotation about the axes thereof for spin stabilization to aid in direction of the satellites to the orbits. The satellites continue to rotate in the orbits.

The area of reflection or silhouette area of a satellite of cylindrical configuration varies non-lineally from a maximum value in the attitude of normal relation of the axis of the configuration with the line of sight of the tracking devices, to a minimum value with the axis in the attitude of coincidence with the line of sight.

Attitudes of smaller angle than the normal relation therefore present difficulties in tracking, and it is an object of our invention to provide such satellites with a device to augment the transverse area of the satellite for substantially uniform silhouette thereof.

A further object of our invention is to provide such a device disposed substantially to continue the spin stabilization of the satellite.

An additional object of our invention is to provide such a device disposed for substantially constant illumination of the satellite.

Other aims and objects of our invention will appear from the following description.

In carrying out our invention, a satellite is mounted on a vehicle with the satellite disposed for rotation about the principal axis thereof to provide spin stabilization for accurate guidance and control of the combination during traverse of the atmosphere. The satellite continues to travel in an orbit around a space body and the rotation continues in the orbit.

A skirt of pliable material is intermediately secured to the structure for augmentation of the transverse area thereof responsive to the rotation. The structure is provided with a circumferential groove adjacent the skirt for stowage thereof during traverse of the atmosphere and a normally flat band is provided for enclosure of the skirt in the groove.

A holding device is provided with a frame secured to the structure and the band is secured in position for the enclosure by a clamp secured to the frame by a shear pin to grip the ends of the band. Squibs are disposed in a chamber of the frame for generation of gas in the orbit responsive to a signal. The pin is disposed to shear responsive to a predetermined value of the pressure of the gas for release of the clamp and the clamp and band are disposed for centrifugal separation from the satellite responsive to the rotation. For more complete understanding, reference is directed to the following description and the accompanying drawing, in which, FIGURE 1 is a partial perspective view of the satellite with a circumferential band secured thereon;

FIGURE 2 is a view similar to FIGURE 1 with the band released from the satellite;

FIGURE 3 is a view similar to FIGURE 2 with a skirt secured to the satellite and partially unfurled;

FIGURE 10 is a graph of the relationship of attitude of the satellite to the silhouette area thereof for various diameters of the skirt.

Figure 4:
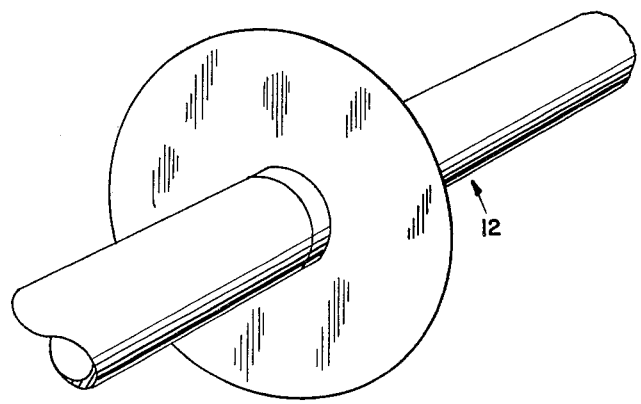
FIGURE 4 is a view similar to FIGURE 3 with the skirt fully extended for augmentation of the reflective area of the satellite.

Accordingly, a satellite 12 includes a cylindrical structure 14 provided with an axis 16 and disposed for traverse of the atmosphere and travel in an orbit about a space body. The structure is additionally disposed for rotation about the axis for stabilization in the traverse and the rotation continues after entry of the satellite in the orbit.

A skirt 17 is secured to structure 14 in furlable relation therewith and disposed of pliant material to unfurl for evolution to transverse flanged relation to the structure for augmentation of the visually reflective area of the satellite responsive to the rotation. Skirt 17 comprises a pair of layers of nylon cloth disposed in bias arrangement of 45° to provide maximum strength of the skirt. The material of the skirt is disposed for reflection of substantially 50% of the light incident to the satellite and transmission of the remainder of the incident light for substantially constant illumination of the skirt at a particular point in orbit, whether the attitude of the satellite permits the sensible rays of the sun to be transmitted through the skirt or reflected therefrom. The material of the skirt weighs 1.43 ounces per square yard and the skirt is symmetrically secured to the structure. A groove 18 is provided in the structure adjacent skirt 17 for stowage thereof in the groove during the traverse. A normally flat band 19 of resilient material is provided for engagement with structure 14 to cover groove 18 and provide continuation of skin 20 of the structure.

A holding device 22 includes a frame 24 secured to structure 14 and squibs 26 secured in a chamber 27 of the frame. The holding device is provided with a clamp 28 having a plunger 30 disposed for slidable operation in an aperture 31 of frame 24, and a plate 32 secured to plunger 30. A pin 34 is biased by a spring 36 in engagement with frame 24 to a normal position engaging holes 38 of plunger 30 to secure the ends 40 of band 19 between plate 32 and frame 24 for enclosure of skirt 17 in groove 18.

Skin 20 is provided with a slit 46 for admission of a tool therein for compression of spring 36, and plunger 30 is disposed in aperture 31 for engagement with pin 34 to block the pin from the normal position. Plunger 30 is slidably disposed for engagement in orifice 50 of chamber 27 to complete the enclosure thereof responsive to operation of plunger 30 into orifice 31 for engagement of pin 34 with hole 38.

*Operation*

After the traverse, squibs 26 are ignited by an electrical device (not shown) to generate pressure of gas in chamber 27 and pin 34 is disposed to shear for release of band 19 responsive to a predetermined value of the pressure. Band 19 flattens responsive to the release, and clamp 28 and band 19 are disposed for centrifugal separation from structure 14 responsive to the rotation, to free skirt 17 for the flanged relation.

Figure 5:
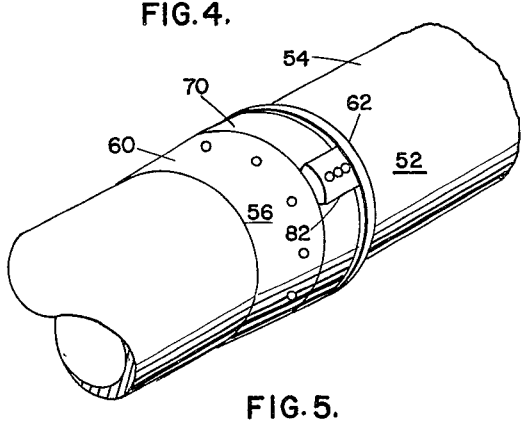
FIGURE 5 is a view of cylindrical satellite with a device for addition of a similar skirt thereto.
Figure 6:
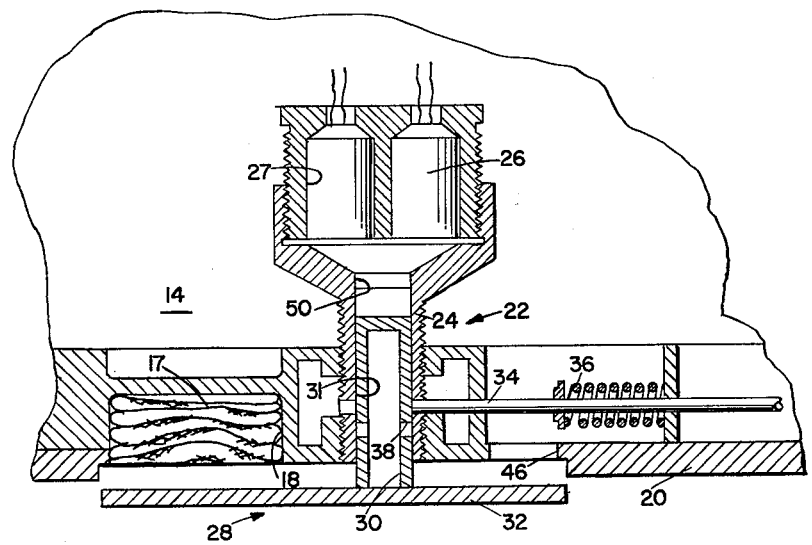
FIGURE 6 is a sectional view of the satellite shown in FIGURE 1 with the pin in normal position.
Figure 7:
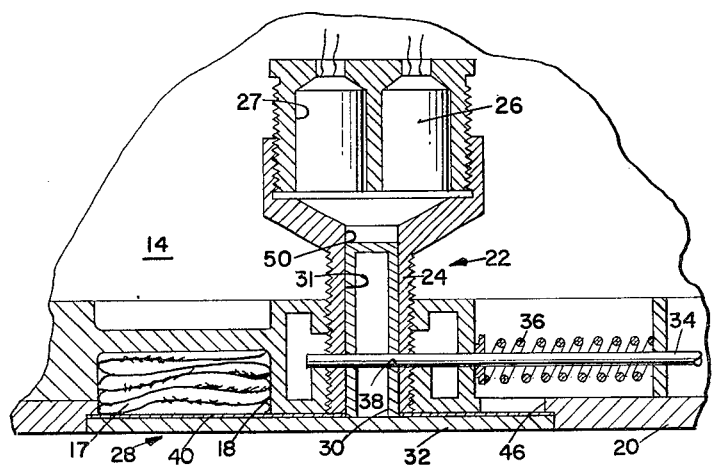
FIGURE 7 is a view similar to FIGURE 6 with the pin excluded from the normal position.
Figure 8:
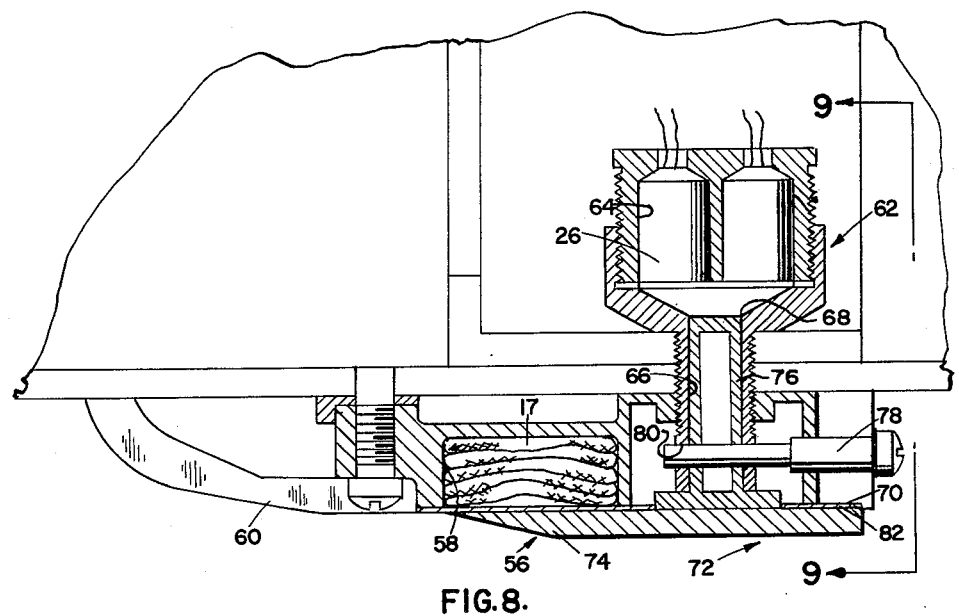
FIGURE 8 is a view similar to FIGURE 7 of the satellite shown in FIGURE 5.
Figure 9:
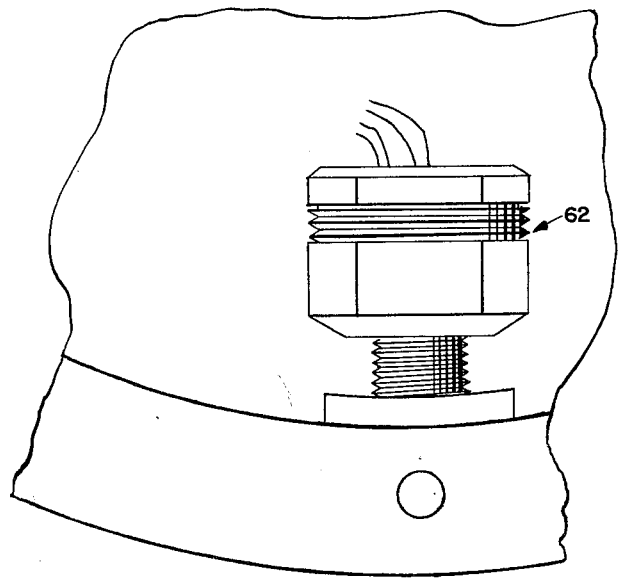
FIGURE 9 is a view along line 9—9 of FIGURE 8.

In the alternate embodiment of our invention, shown in FIGURE 5, a satellite 52 provided with a cylindrical skin 54 and disposed for rotation in orbit is provided with a container 56 including a chamber 58 for storage of a similar skirt 17. The container includes a tapered nose section 60 for streamlining.

Container 56 includes a holding device 62 with a chamber 64 projecting within satellite 52 and an aperture 66 communicating with the chamber through an orifice 68. A similar normally flat band 70 of resilient material is provided and a clamp 72 includes a plate 74 secured to a plunger 76. A pin 78 projects through container 56 to engage holes 80 in plunger 76 and secure ends 82 of band 70 to container 56 for enclosure therein of skirt 17 during the traverse. Plunger 76 engages orifice 68 to complete enclosure of squibs 26 in the chamber.

The squibs are disposed for ignition subsequent to the traverse for generation of gas, and pin 78 is disposed for shear to release band 70 responsive to a predetermined value of pressure of the gas.

Band 70 flattens and clamp 72 and band 70 are disposed for centrifugal separation from satellite 52 to release skirt 17 for similar augmentation of the transverse area of the satellite, responsive to the rotation.

FIGURE 10 shows the relationship of the silhouette areas to various diameters of the skirt and to various angles between the satellite axis and a line of sight.

While the foregoing is a description of the preferred embodiment, the following claims are intended to include those modifications and variations that are within the spirit and scope of our invention.

What is claimed is:

1. A satellite for traverse of the atmosphere and travel in an orbit about a space body, comprising a cylindrical structure provided with an axis and disposed for rotation about said axis in the orbit; and a skirt secured to the surface of said structure in furlable relation therewith and disposed of pliant material to evolve and to provide a flange in substantially normal relation to said axis responsive to the rotation for substantially equal visibility of said satellite in any attitude thereof.

2. A satellite for traverse of the atmosphere and travel in an orbit about a space body, comprising a cylindrical structure provided with an axis and disposed for rotation about said axis in the orbit; and a skirt secured to the surface of said structure and disposed of pliant material for evolution to provide a flange in substantially normal relation to said axis responsive to the rotation; said structure being provided with a circumferential groove for stowage therein of said skirt; and a flat band resiliently disposed for engagement with said structure to enclose said skirt in said groove for streamlining of said satellite; said structure being disposed for retention of said band in the engagement during the traverse and release of said band in the orbit for the evolution.

3. A satellite as in claim 2 with a holding device comprising a frame secured in said structure and provided with a chamber and an aperture communicating therewith; squibs secured in said chamber for combustion in the orbit to generate gas; a clamp to engage said band; and a pin disposed for simultaneous engagement with said frame and said clamp in a normal position to secure said band to said frame for the retention; said clamp being slidably disposed in said aperture for shear of said pin for the release responsive to a predetermined value of pressure of the gas.

4. A satellite as in claim 3, with said structure provided with a skin; said circumferential groove disposed to extend within said structure and to interrupt said skin; said pin slidably secured in said frame and spring-biased to a normal position for the simultaneous engagement; and a piston slidably disposed in said aperture to exclude said pin from said normal position; and said band being disposed for continuation of said skin in the retention; said clamp being disposed for slidable operation into said aperture to displace said piston for the simultaneous engagement, and out of said aperture for the shear responsive to the pressure.

5. A satellite as in claim 4 with said skin provided with a slit for access of a tool therein and displacement of said pin from the position of the simultaneous engagement.

6. A satellite for traverse of the atmosphere and travel in an orbit about a space body, comprising a cylindrical structure provided with an axis and disposed for rotation about said axis in the orbit; and a skirt secured to the surface of said structure and disposed of pliant material for evolution to provide a flange in substantially normal relation to said axis responsive to the rotation; said skirt including a pair of fabric layers secured together for minimum increase in the weight of said satellite.

7. A satellite as in claim 6 with said layers disposed in bias relation for maximum strength of said skirt.

8. A satellite as in claim 7 with said skirt formed of material disposed for 50% refletcion of light incident thereto and 50% transmission of the incident light for substantially constant illumination of said satellite at a particular point in the orbit.

9. A satellite as in claim 1 with said skirt circularly disposed and provided with a radius to provide substantially constant reflective area of said satellite in any attitude thereof in the orbit.

10. A satellite for operation in a space orbit comprising: a cylindrical structure provided with a longitudinal axis and an enclosing skin, and disposed for rotation about said axis in the orbit; a container peripherally secured to said skin and provided with a nose section tapered for streamlined relation with said skin, and a circumferential groove; a chamber projecting through said container and within said skin; squibs disposed in said chamber; a skirt of pliant material secured to said container and disposed for storage in said groove; a band for engagement with said container; a clamp disposed to complete enclosure of said chamber and to engage said band for enclosure of said skirt; and a pin for engagement with said container and said clamp to secure said enclosure; said clamp being disposed to shear said pin responsive to ignition of said squibs for release of said skirt; and said skirt being disposed for evolution to provide a transverse flange responsive to the rotation.

References Cited in the file of this patent

UNITED STATES PATENTS

| | | |
|---|---|---|
| 1,201,763 | Rimailho | Oct. 17, 1916 |
| 2,887,055 | Bagdanovich et al. | May 19, 1959 |
| 3,064,534 | Tumavicus | Nov. 20, 1962 |